United States Patent
Babizki et al.

(10) Patent No.: US 10,027,121 B2
(45) Date of Patent: Jul. 17, 2018

(54) METHOD AND APPARATUS FOR CONTROLLING STABILITY OF A LOCAL POWER GRID

(71) Applicant: Maschinenfabrik Reinhausen GmbH, Regensburg (DE)

(72) Inventors: Alexei Babizki, Regensburg (DE); Haijun Feng, Regenstauf (DE)

(73) Assignee: Maschinenfabrik Reinhausen GmbH, Regensburg (DE)

(*) Notice: Subject to any disclaimer, the term of this patent is extended or adjusted under 35 U.S.C. 154(b) by 212 days.

(21) Appl. No.: 14/911,392

(22) PCT Filed: Aug. 13, 2014

(86) PCT No.: PCT/EP2014/067330
§ 371 (c)(1),
(2) Date: Apr. 25, 2016

(87) PCT Pub. No.: WO2015/032598
PCT Pub. Date: Mar. 12, 2015

(65) Prior Publication Data
US 2016/0233680 A1 Aug. 11, 2016

(30) Foreign Application Priority Data

Sep. 3, 2013 (DE) .................. 10 2013 109 611

(51) Int. Cl.
*H02J 3/18* (2006.01)
*H02J 3/38* (2006.01)
(Continued)

(52) U.S. Cl.
CPC .............. *H02J 3/1878* (2013.01); *H02J 3/12* (2013.01); *H02J 3/381* (2013.01); *H02M 5/12* (2013.01); *H02P 13/06* (2013.01); *Y02E 40/30* (2013.01)

(58) Field of Classification Search
CPC ..................................................... H02J 3/1878
See application file for complete search history.

(56) References Cited

U.S. PATENT DOCUMENTS

| 6,492,669 B2 | 12/2002 | Nakayama | |
|---|---|---|---|
| 2013/0030597 A1* | 1/2013 | Milosevic | H02J 3/00 700/298 |

FOREIGN PATENT DOCUMENTS

| DE | 102009014243 A | 9/2010 |
|---|---|---|
| DE | 102010018996 A | 11/2011 |

(Continued)

*Primary Examiner* — Daniel Cavallari
(74) *Attorney, Agent, or Firm* — Andrew Wilford

(57) ABSTRACT

The invention relates to a device (1) and a method for controlling the stability of a local network (3). The local network (3) comprises a plurality of outgoing circuits ($4_1$, $4_2$, ..., $4_M$), each having at least one load (5) and/or at least one decentralized energy generation system (6). Said device is provided with an on-load tap-changer (14) for adjusting an output voltage of the local network transformer (10). The device is characterized in that a unit (16) for measuring current, connected to at least one of the plurality of outgoing circuits ($4_1$, $4_2$, ..., $4_M$), and a unit (18) for measuring voltage, connected to a busbar (8) of the local network (3), are arranged in a transformer housing (20).

9 Claims, 3 Drawing Sheets

(51) Int. Cl.
*H02M 5/12* (2006.01)
*H02J 3/12* (2006.01)
*H02P 13/06* (2006.01)

(56) References Cited

FOREIGN PATENT DOCUMENTS

| | | |
|---|---|---|
| DE | 102012202273 A | 2/2013 |
| EP | 2592709 A | 5/2013 |
| WO | 2011076887 A | 6/2011 |

* cited by examiner

METHOD AND APPARATUS FOR CONTROLLING STABILITY OF A LOCAL POWER GRID

CROSS REFERENCE TO RELATED APPLICATIONS

This application is the US-national stage of PCT application PCT/EP2014/067330 filed 13 Aug. 2014 and claiming the priority of German patent application 102013109611.5 itself filed 3 Sep. 2013.

FIELD OF THE INVENTION

The present invention relates to an apparatus for controlling the stability of a local distribution grid by a controllable local distribution transformer.

BACKGROUND OF THE INVENTION

In particular, a local distribution grid has a plurality of branches, and each branch comprises at least one consumer and/or at least one decentralized power generator. A busbar connecting the plurality of branches of the local distribution grid with each other is connected with a controllable local distribution transformer that is also connected with the busbar via an electric line. Voltage measurement for the local distribution grid is provided via the busbar. The adjustment of an output voltage of the local distribution transformer can be carried out by an on-load tap changer.

The invention further relates to a method for controlling the stability of a local distribution grid by a controllable local distribution transformer.

For some time already, the parties involved have been paying attention to the direction of the energy flow, since the energy flow can be reversed in dependence on the present grid situation, weather conditions, present consumption, and the dimensioning of the feeders. This inevitably leads to problems with voltage compliance or with violations of the voltage bands, respectively, which voltage bands have to be complied with in accordance with standard EN 50160. This new development has to be observed and future energy structures will have to compensate for it, as the case may be. The grids constructed in the past, however, were not designed for a bidirectional energy flow.

In accordance with the directive (VDE-AR-N 4105) that came into force in the year 2012, PV inverters should supply the reactive power according to situation (fed active power). Consequently, both the capacitive and the inductive reactive power will play an increasingly important role for voltage compliance in the energy grid. So far, this issue has not been accounted for in any regulation algorithm.

In their mode of functioning, today's power grids are dimensioned to the load flow from the power plant to the consumer. The grid operator's quality management usually ensures that the quality criteria for voltage quality are complied with in accordance with DIN EN 50160 at all consumer connections of the respective grid.

The German patent application DE 10 2010 018 996 A1 discloses an apparatus and method for measuring the grid impedance of an electric supply network, in particular in a supply network, in which there either is no reference conductor or none is available. By providing an excitation signal to different interlinked phases, it is possible to measure a corresponding response signal. The grid impedance is calculated from the various excitation signals and the various response signals of the different interlinked phases.

A method for the adaptive regulation of the supply voltage in local distribution grids, into which electric energy, in particular in the form of solar energy or photovoltaic energy, is feedable and from which it is withdrawn by consumers, can be gathered from the German patent application DE 10 2011 108 255 A1. At least one transformer is used for regulation, which transformer is provided between a medium-voltage grid and a low-voltage grid. In order to carry out the regulation, different state variables of at least one of the feeders/consumers, such as, for instance, current, voltage, consumption, energy input, energy loss, or the like, are determined within the respective local distribution grid. For each phase, these state variables are fed to a regulator, in particular to a multivariable regulator. The respective regulator compares these state variables as input values against desired values/reference values and generates at least one regulating variable that is supplied to an electronically regulated transformer. Via the electronically regulated transformer, a regulated mains voltage deviating from the determined state variable is adjusted within specifiable steps in the respective local distribution grid, which mains voltage is measurable at a specifiable location of the local distribution grid.

The European patent application EP 2 592 709 A1 discloses a method for controlling the stability of a low-voltage grid, where an electric current is fed into a low-voltage grid by a local distribution transformer. The medium voltage is transformed to low voltage in the local distribution transformer. The low-voltage grid has a main power line, where electric current is conducted from the main power line via a grid branch point into at least one branch power line, with which at least one electricity consumer (consumer) and/or one electricity generator (feeder) is connected. The branch power line with the consumer and/or feeder connected therewith forms an autarkic grid district. At least one sensor is arranged at the grid branch point, at which the branch power line branches off from the main power line. The current flow in the branch power line and/or the voltage in the branch power line are measured by the sensor. An electricity withdrawal by the consumer from the branch power line and/or an energy input by the feeder into the branch power line and/or an electricity input from the main power line into the branch power line and/or the feed of the electric current from the local distribution transformer into the low-voltage grid is regulated on the basis of the current flow determined by the sensor and/or of the voltage determined by the sensor, with the provision that a branch power line overload is avoided in the grid district and/or that a voltage band is complied with in the grid district.

The international patent application WO 2011/076887 discloses a method for power regulation within a network segment of an alternating current network, which network segment has at least temporarily at least one electric storage. The network segment is connected via a transformer with a higher-level network level of the alternating current network, which level operates at a higher voltage than the network segment. Power fed in by the electric storage into the network segment and/or a power withdrawn by the electric storage from the network segment is carried out in dependence on an operating parameter of the network segment. It is provided that the power input is also carried out in dependence on a voltage difference between a feed voltage at a feed-in point of the electric storage and a transformer output voltage at a contact connected with a segment-side transformer output.

Based on the insights gained from the simulations, the information required for the quantitative assessment is generated, such as voltage fluctuations, currents and losses in the lines as well as the regulating requirements (switching intensity and switching quantity) of the on-load tap changer per year. This information provides a clear value added for the future regulating strategies; it is, for instance, possible to comply with the limit values set by the energy supply companies in a significantly more efficient manner.

OBJECT OF THE INVENTION

A first object of the invention is therefore to create an apparatus that can maintain the overall stability of the local distribution grid system significantly more efficiently, more reliably, and more cost-effectively within prescribed limit values.

A second object of the invention is further to create a method that maintains the overall stability of the local distribution grid system significantly more efficiently, more reliably, and more cost-effectively within prescribed limit values.

SUMMARY OF THE INVENTION

The first object is fulfilled by an apparatus for controlling the stability of a local distribution grid, wherein of the plurality of branches, only critical branches are connected with the current-measuring device. 1085Warb The second object is fulfilled by a method for controlling the stability of a local distribution grid, the method comprising the steps defined in more detail below.

The advantage of the apparatus according to the invention is that a current-measuring device that is connected with at least one of the plurality of branches, and voltage-measuring device that is connected with a busbar, are integrated with a transformer housing of the local distribution transformer. The current-measuring device and the voltage-measuring device preferentially form a constructional unit.

From among the plurality of branches, only critical branches are connected with the current-measuring device. If the number of critical branches changes over the course of time, the current-measuring device has to be re-configured. This can be carried out in one location, namely in the transformer housing or in the local distribution grid station, respectively. Furthermore, a verification device is also integrated in the transformer housing with the current-measuring device and the voltage-measuring device. By means of the verification device, a compliance with a band upper limit and a band lower limit of the voltage in the local distribution grid is verifiable or adjustable, respectively. The current-measuring device, the voltage-measuring device, and the verification device form a voltage regulator that is connected with an on-load tap changer of the local distribution transformer for the purpose of adjusting the taps of the local distribution transformer.

The method according to the invention for controlling the stability of a local distribution grid is characterized by the following steps:

defining the critical branches of the local distribution grid;

determining the equivalent impedance for each critical branch for the minimum node voltage in the emerging scenario;

determining the equivalent impedance for each critical branch for the maximum node voltage in the emerging scenario;

calculating the present complex current, with the calculating being carried out for each of the critical branches of the local distribution grid;

calculating a test voltage;

verifying a band upper limit and a band lower limit in dependence on a direction of an apparent power according to a consumer current direction system; and changing the voltage in the local distribution grid by an on-load tap changer adapting a tap position at a local distribution transformer so that the voltage in the local distribution grid remains below the band upper limit and above the band lower limit.

A voltage value at a critical node of the critical branches is determined from the voltage at a busbar and from a voltage increase or a voltage reduction. The voltage measurement at the busbar as well as the current measurement at each critical branch is carried out in the transformer housing in a current-measuring device and in a voltage-measuring device.

An apparent power of the respectively critical branch is calculated from the measured data. The measured data are transmitted to a verification device that verifies the compliance with the band upper limit and with the band lower limit of the voltage. On exceeding the band upper limit or on falling below of the band lower limit, the verification device causes an adjustment of the taps of the local distribution transformer.

The branches are referred to as critical branches of the local distribution grid if power fed in or power withdrawn, respectively, a length of a line or of a cable of the respective branch, or a high impedance of line or cable in the respective branch exceed a predefined threshold.

BRIEF DESCRIPTION OF THE DRAWING

In the following passages, the invention and its advantages are described in more detail by reference to the attached drawings, in which.

SPECIFIC DESCRIPTION OF THE INVENTION

Figure 1A:
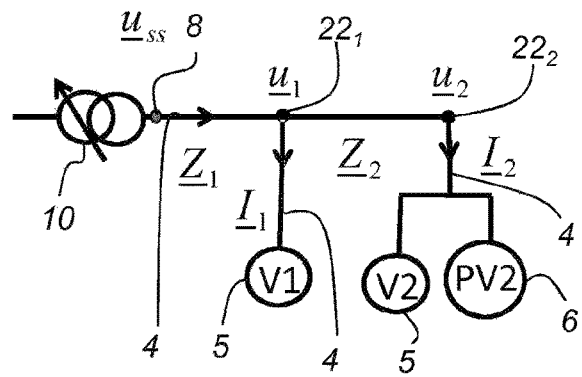
FIG. 1A is a schematic illustration for analyzing the voltage reduction.

The same or equivalent elements of the invention are designated by identical reference characters. Furthermore and for the sake of clarity, only the reference characters relevant for describing the respective figure are provided. It should be understood that the detailed description and specific examples of the apparatus and method according to the invention are intended for purposes of illustration only and are not intended to limit the scope of the invention.

Figure 1B:
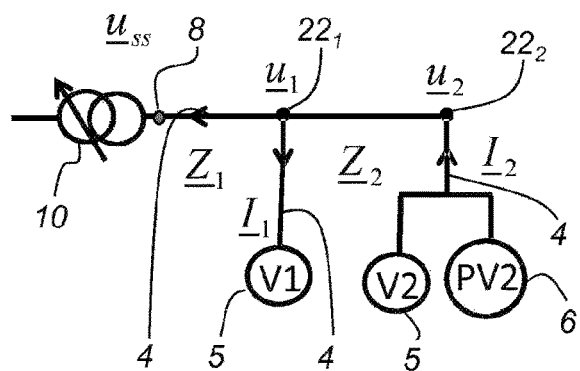
FIG. 1B is a schematic illustration for analyzing the voltage increase.

FIG. 1A is a schematic illustration for analyzing the voltage reduction and FIG. 1B shows a schematic illustration for analyzing the voltage increase. The proposed regulation algorithm is a method that takes into account both reactive power and active power. In this context, an equivalent grid impedance for voltage increase and voltage reduction is differentiated and determined separately for the two theoretically possible instances (see FIG. 1A or 1B, respectively).

In the example shown in FIG. 1A and FIG. 1B, a consumer 5 is connected with a busbar 8 at the first node 22$_2$. A consumer 5 is also connected with the second node 22$_2$, as is a decentralized power generator 6. The busbar 8 is connected with a controllable local distribution transformer 10.

This procedure can be explained in more detail by means of the instance of the voltage reduction (FIG. 1A) and of the voltage increase (FIG. 1B). By way of Kirchhoff's circuit laws and the additional information from the nodes 22$_1$ and 22$_2$ concerned, the equivalent impedance in the instance of the minimum voltage reduction $\underline{Z}_{eq}^{min}$ and the equivalent impedance in the instance of the maximum voltage increase $\underline{Z}_{eq}^{max}$ can be determined. By means of the calculated grid impedance $\underline{Z}_{eq}^{min}$ or $\underline{Z}_{eq}^{max}$ and the determined complex current at the branch 4, the voltage reduction Δu or the voltage increase Δu, respectively, between the busbar 8 and the second critical node 22$_2$ is determined. A branch 4 is referred to as critical if there is a large power input or power withdrawn, respectively, if a long line or cable form the branch 4, or if there is a high impedance of line or cable in the respective branch 4.

The voltage reduction Δu or the voltage increase Δu, respectively, is calculated from equation (1):

$$\Delta \underline{u} = \underline{u}_{SS} - \underline{u}_2 \quad (1),$$

provided that: $u_{SS}$ represents the measured value in the transformer station.

The equations (2) and (3) apply to the voltage reduction:

$$\Delta \underline{u} = (\underline{I}_1 + \underline{I}_2) \times \underline{Z}_{eq}^- = (\underline{I}_1 + \underline{I}_2) \times Z_1 + \underline{I}_2 \times Z_2 \quad (2)$$

and $$\underline{Z}_{eq}^- = Z_1 + \frac{\underline{I}_2}{\underline{I}_1 + \underline{I}_2} \times Z_2 \quad (3)$$

$$|\underline{Z}_{eq}^-| < |Z_1 + Z_2|$$

The equations (4) and (5) apply to the voltage increase:

$$-\Delta \underline{u} = (\underline{I}_2 + \underline{I}_1) \times \underline{Z}_{eq}^+ = (\underline{I}_2 + \underline{I}_1) \times Z_1 + \underline{I}_2 \times Z_2 \quad (4)$$

and $$\underline{Z}_{eq}^+ = Z_1 + \frac{\underline{I}_2}{\underline{I}_2 - \underline{I}_1} \times Z_2 \quad (5)$$

$$|\underline{Z}_{eq}^+| > |Z_1 + Z_2|$$

For the voltage reduction, the current $I_2-I_1$ is determined at the branch 4 from P and Q and $u_{SS}$ is also measured in the transformer station. Equation (6) applies to a normal current at the second node 22$_2$:

$$\underline{u}_2 = \underline{u}_{SS} - \underline{Z}_{eq}^-(\underline{I}_1 + \underline{I}_2) \quad (6),$$

provided that:

$$\underline{Z}_{eq}^- = \frac{u_{ss} - u_2}{I_1 + I_2}$$

Equation (7) applies to a minimum voltage $u_2^{min}$:

$$\underline{u}_2^{min} = \underline{u}_{SS} - \underline{Z}_{eq}^{min}(\underline{I}_1 + \underline{I}_2) \quad (7),$$

provided that:

$$\underline{Z}_{eq}^{min} = \frac{u_{ss} - u_2^{min}}{I_1 + I_2}$$

For most situations thus results:

$$|\underline{Z}_{eq}^-| < |\underline{Z}_{eq}^{min}|$$

$$|\underline{u}_2^{Pruf}| = |\underline{u}_{SS} - \underline{Z}_{eq}^{min} \times (\underline{I}_1 + \underline{I}_2)| < |\underline{u}_2|$$

For the voltage increase, the current $I_2-I_1$ is determined at the branch 4 from P and Q, and $u_{SS}$ is also measured in the transformer station. Equation (8) applies to a normal current $U_2$ at the second node 22$_2$ (FIG. 1B):

$$\underline{u}_2 = \underline{u}_{SS} + \underline{Z}_{eq}^+(\underline{I}_2 - \underline{I}_1) \quad (8),$$

provided that:

$$Z_{eq}^+ = \frac{u_2 - u_{ss}}{I_2 - I_1}$$

Equation (9) applies to a maximum current $u_2^{max}$ at the second node 22$_{22}$ (FIG. 1B):

$$\underline{u}_2^{max} = \underline{u}_{SS} + \underline{Z}_{eq}^{max}(\underline{I}_2 - \underline{I}_1) \quad (9),$$

provided that:

$$Z_{eq}^{max} = \frac{u_2^{max} - u_{ss}}{I_2 - I_1}$$

For most situations thus results:

$$|\vec{Z}_{eq}^+| < |\underline{Z}_{eq}^{max}|$$

$$|\underline{u}_{2+}^{Pruf}| = |\underline{u}_{SS} - \underline{Z}_{eq}^{max} \times (\underline{I}_2 + \underline{I}_1)| < |\underline{u}_2|$$

Figure 2:
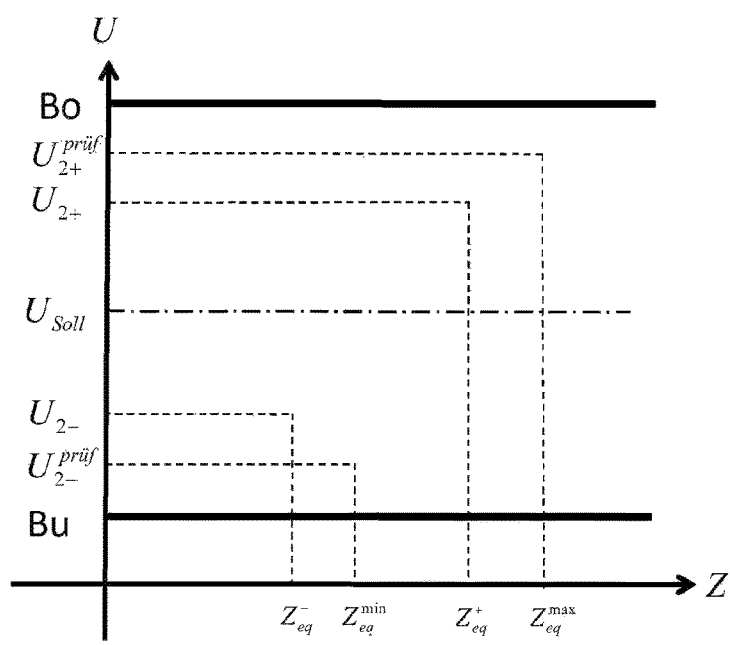
FIG. 2 is a graphic illustration of the relation between impedance and voltage of a band upper limit and of a band lower limit.

FIG. 2 shows a graphic illustration of the relation between the impedance Z and voltage U of a band upper limit $B_O$ and a band lower limit $B_U$. Band upper limit $B_O$ and the band lower limit $B_U$ are dependent on a desired voltage $U_{Soll}$. If, for instance, the desired voltage $U_{Soll}$ is 400 V, then, for instance, the band upper limit $B_O$ deviates by +2% and the band lower limit $B_U$ deviates by −2% from the desired voltage $U_{Soll}$. If the band upper limit $B_O$ is exceeded or the band lower limit $B_U$ falls below, the tap position of the local distribution transformer 10 is correspondingly adjusted by the on-load tap changer 14 such that exceeding the band upper limit $B_O$ or falling below of the band lower limit $B_U$ is avoided.

Figure 3:
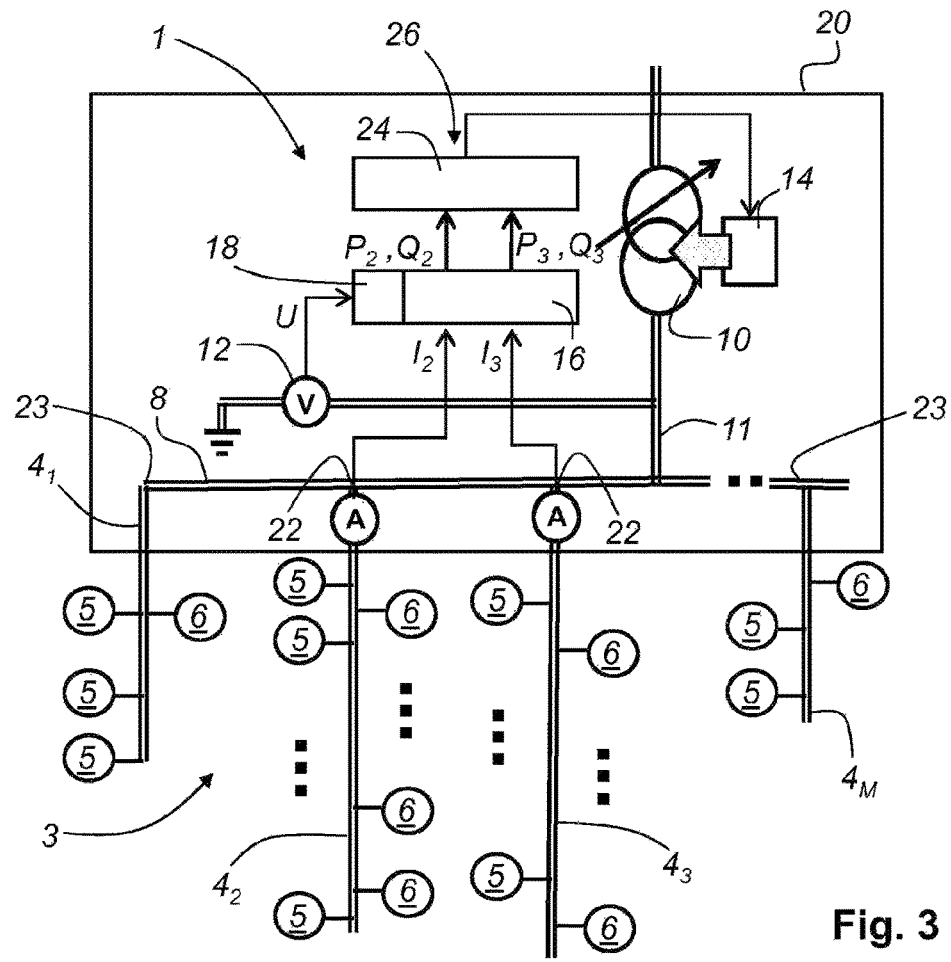
FIG. 3 is a schematic illustration of the apparatus for controlling the stability of a local distribution grid.

FIG. 3 shows a schematic illustration of the apparatus 1 for controlling the stability of a local distribution grid 3. The local distribution grid 3 has a plurality of branches 4$_1$, 4$_2$, ..., 4$_M$, with each branch 4$_1$, 4$_2$, ..., 4$_M$ comprising at least one consumer 5 and/or at least one decentralized power generator 6. The decentralized power generator 6 can be understood to refer to a photovoltaic system, a biogas plant, etc. In the illustration shown in FIG. 3, there are three consumers 5 in the first branch 4$_1$, of which one consumer 5 has a photovoltaic system as a decentralized power generator 6 on the roof of the house. The M$^{th}$ branch 4$_M$ has two consumers 5 and a decentralized power generator 6 that is independent on the consumers 5, and which is also a photovoltaic system. The plurality of branches 4₁, 4₂, . . . , 4_M is connected with each other or interlinked, respectively, and connected to a controllable local distribution transformer 10 by a busbar 8. The local distribution transformer 10 is connected with the busbar 8 via a cable 11. A voltage measurement for the local distribution grid 3 is provided and connected with an on-load tap changer 14 for adjusting an output voltage of the local distribution transformer 10. The local distribution transformer 10 is accommodated in a transformer housing 20. A current-measuring device 16 that is connected with at least one of the plurality of branches 4₁, 4₂, . . . , 4_M, and a voltage-measuring device 18 that is connected with a busbar 8, are integrated in the transformer housing 20.

Four branches 4₁, 4₂, 4₃, and 4_M are represented in the illustration shown in FIG. 3. Here, the second branch 4₂ and the third branch 4₃ that branch off from the node 22, are referred to as critical branches. The first branch 4₁ and the fourth branch 4_M that branch off from the node 23, were assessed as non-critical branches and therefore not taken into account for controlling the stability of the local distribution grid 3. Thus, only the current $I_2$ of the second branch 4₂ and the current $I_3$ of the third branch 4₃ are measured by the current-measuring device 16 in the transformer housing 20. In parallel, the voltage applied to the busbar 8 is measured by the device 18. From the measured data, the apparent powers $S_2$ and $S_3$ of the branches 4₂ and 4₃ are calculated, subsequently transmitted to a verification device 24 that verifies the compliance with the band upper limit $B_O$ and with the band lower limit $B_U$. The current-measuring device 16, the voltage-measuring device 18, and the verification device 24 form a voltage regulator 26 for the purpose of adjusting the taps of the local distribution transformer 10.

Figure 4:
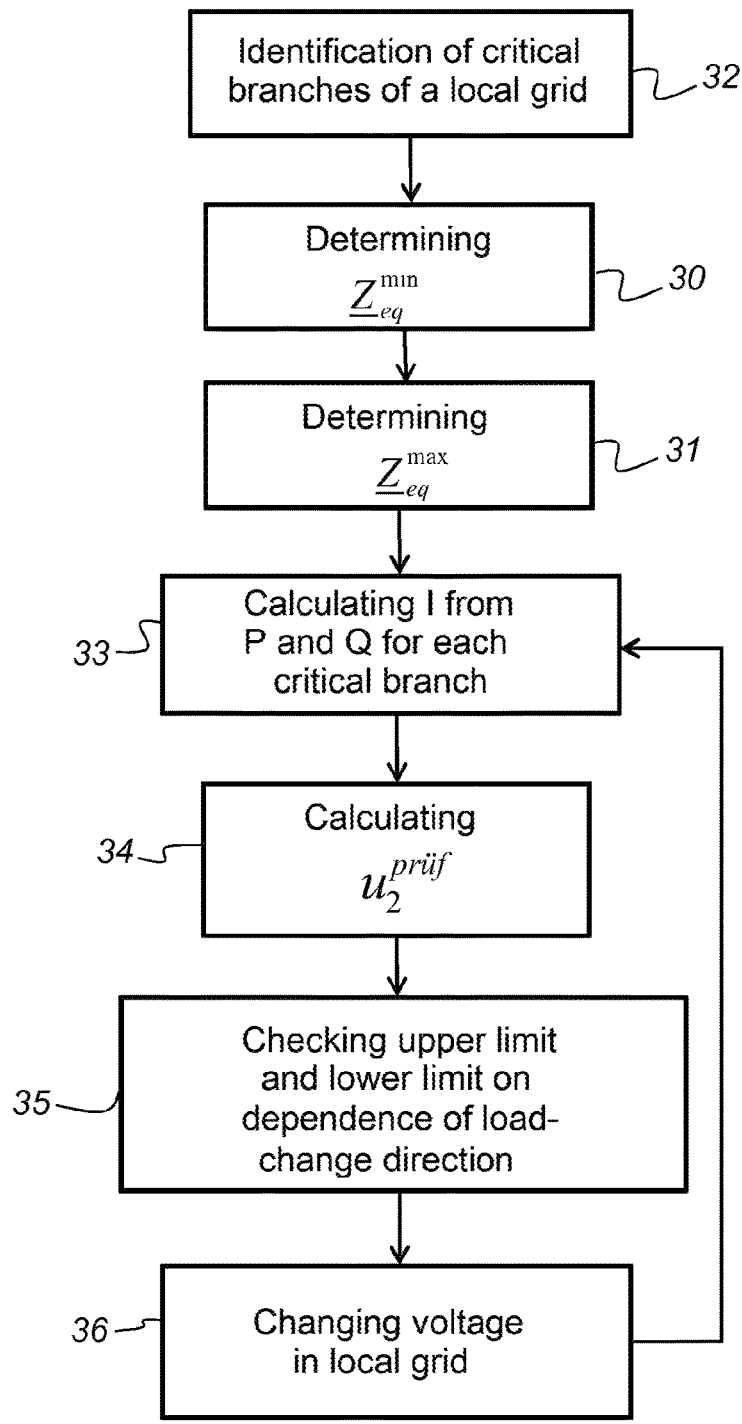
FIG. 4 is a flow chart of the method for controlling the stability of a local distribution grid.

FIG. 4 shows a flow chart of the method according to the invention for controlling the stability of a local distribution grid 3. First, the definition 32 of the critical branches of the local distribution grid 3 is carried out. This is then followed by a determination 30 of the equivalent impedance $Z_{eq}^{min}$ for each critical branch for the minimum node voltage and by a determination 31 of the equivalent impedance $Z_{eq}^{min}$ for each critical branch for the maximum node voltage. The determination 30, 31 can be carried out by way of simulation or by way of measurement at the real local distribution grid 3 to be controlled. Calculating 33 per unit (see equation 10) from P and Q is carried out for each of the critical branches of the local distribution grid 3 (consumer current direction system):

$$I = \frac{P - jQ}{u_{ss}} \quad (10)$$

Calculating 34 from $u_2^{Pruf}$ is subsequently carried out, provided that $|u_{2-}^{Pruf}| = |u_{SS} - Z_{eq}^{min} \times I|$ applies to the voltage reduction and $|u_{2+}^{Pruf}| = |u_{SS} - Z_{eq}^{max} \times I|$ to the voltage increase. According to the direction of the apparent power, verifying 35 of the band upper limit $B_O$ and of the band lower limit $B_U$ is carried out. If the band upper limit $B_O$ is exceeded or the band lower limit $B_U$ is fallen below of, respectively, changing 36 of the voltage is carried out in the local distribution grid 3. For this purpose, the tap position of the local distribution transformer 10 is correspondingly adjusted by the on-load tap changer 14 such that exceeding the band upper limit $B_O$ or falling below of the band lower limit $B_U$, respectively, is avoided. Calculating I is always carried out in order to achieve a prompt adjustment of the voltage or controlling of the stability, respectively, of the local distribution grid 3.

In the instance of the number of the critical branches changing in an existing local distribution grid, the steps 30 to 31 have to be carried out again. The apparatus 1 from FIG. 3 also has to be re-configured then. This means that the possibility must be created of monitoring and measuring the branches previously rated as non-critical. In these methods, currents are measured in the transformer housing 20 or in the local distribution grid station, respectively, for all critical branches having been calculated or simulated in advance. In this context, however, no expensive and volatile remote sensors are used.

Figure 5:
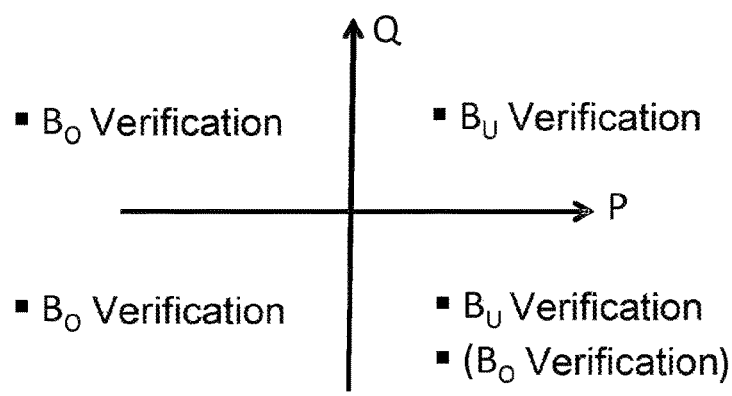
FIG. 5 shows a verification of $B_O$ and $B_U$ according to the present apparent power (consumer current direction system).

FIG. 5 shows the verification (consumer current direction system 40) of $B_O$ and $B_U$ in four quadrants, which verification is used for the apparent power-dependent voltage regulation.

The invention claimed is:

1. A method of controlling the stability of a local distribution grid, the method comprising the following steps:
   defining critical branches of the local distribution grid;
   determining the equivalent impedance for each critical branch for the minimum node voltage in the local distribution grid;
   determining the equivalent impedance for each critical branch for the maximum node voltage in the local distribution grid;
   calculating the present current for each of the critical branches of the local distribution grid;
   calculating a test voltage;
   verifying a band upper limit and a band lower limit in dependence on a direction of an apparent power variation according to a consumer current direction system; and
   changing the voltage in the local distribution grid by altering a tap position of an on-load tap changer at a local distribution transformer so that the voltage in the local distribution grid remains between the band upper limit and the band lower limit.

2. The method according to claim 1, wherein a branch is identified as critical if
   power fed in into or power withdrawn from the branch exceeds a predetermined threshold,
   a length of a line or of a cable of the branch exceeds a predetermined threshold, or
   an impedance of a line or cable in the branch exceeds a predetermined threshold.

3. The method according to claim 1, wherein a verification device integrated with the current-measuring device and with the voltage-measuring device in the transformer housing carrying out the step of verifying compliance with the band upper limit and with the band lower limit.

4. The method according to claim 3, wherein
   the current-measuring device, the voltage-measuring device, and the verification device form a voltage regulator that is connected with the on-load tap changer for adjusting the taps of the local distribution transformer.

5. The method according to claim 1, further comprising the step of:
   determining a voltage value at each of the critical nodes of the critical branches from the voltage at a busbar and from a voltage increase or decrease.

6. The method according to claim 5, further comprising the step of:

carrying out the voltage measurement at the busbar as well as a current measurement at each critical branch in the transformer housing by a current-measuring device and by a voltage-measuring device.

7. The method according to claim 1, further comprising the step of:

calculating an apparent power of the critical branch from the measured data; and transmitting the calculated apparent power to a verification device that verifies compliance with the band upper limit and with the band lower limit.

8. The method according to claim 1, further comprising the step of:

the verification device adjusting taps of the local distribution transformer on exceeding the band upper limit or on falling below of the band lower limit.

9. The method according to claim 1, further comprising the step of:

identifying branches as critical branches of the local distribution grid if power fed in or power withdrawn exceeds a predetermined threshold, a length of a line or of a cable of the branch exceeds a predetermined threshold, or an impedance of a line or cable in the respective branch exceeds a predefined threshold.

\* \* \* \* \*